United States Patent
Putnam, Jr.

(10) Patent No.: US 10,979,797 B2
(45) Date of Patent: Apr. 13, 2021

(54) IN-LINE HEADPHONE CORD HOLDER

(71) Applicant: John E. Putnam, Jr., Boulder, CO (US)

(72) Inventor: John E. Putnam, Jr., Boulder, CO (US)

(*) Notice: Subject to any disclaimer, the term of this patent is extended or adjusted under 35 U.S.C. 154(b) by 90 days.

(21) Appl. No.: 16/183,486

(22) Filed: Nov. 7, 2018

(65) Prior Publication Data
US 2019/0141431 A1 May 9, 2019

Related U.S. Application Data

(60) Provisional application No. 62/582,843, filed on Nov. 7, 2017.

(51) Int. Cl.
| | |
|---|---|
| *H04R 1/10* | (2006.01) |
| *B65H 75/26* | (2006.01) |
| *B65H 75/28* | (2006.01) |
| *B65H 75/06* | (2006.01) |
| *F16B 2/22* | (2006.01) |

(52) U.S. Cl.
CPC ........... *H04R 1/1033* (2013.01); *B65H 75/06* (2013.01); *B65H 75/26* (2013.01); *B65H 75/28* (2013.01); *H04R 1/1016* (2013.01); *B65H 2701/3919* (2013.01); *F16B 2/22* (2013.01)

(58) Field of Classification Search
CPC .... H04R 1/1033; H04R 1/1016; B65H 75/06; B65H 75/26; B65H 75/28; B65H 2701/3919; F16B 2/22
See application file for complete search history.

(56) References Cited

U.S. PATENT DOCUMENTS

| | | | |
|---|---|---|---|
| 1,371,619 A | 3/1921 | Greenstreet | |
| 2,229,935 A | 1/1941 | Powers | |
| 4,244,544 A | 1/1981 | Kornat | |
| 5,316,246 A | 5/1994 | Scott et al. | |
| D372,188 S | 7/1996 | Van | |
| 5,954,301 A | 9/1999 | Joseph et al. | |
| 6,206,330 B1 | 3/2001 | Oi et al. | |
| 6,302,347 B1* | 10/2001 | Amirault | B65H 75/06 242/388.1 |
| 6,527,213 B2* | 3/2003 | Philippe | B65D 75/02 242/127 |
| D488,054 S | 4/2004 | Myers | |

(Continued)

FOREIGN PATENT DOCUMENTS

| | | |
|---|---|---|
| GB | 2527742 A | 1/2016 |
| WO | 2015162462 A1 | 10/2015 |

OTHER PUBLICATIONS

PCT, "International Search Report and Written Opinion", Application No. PCT/US2018/065283, dated Jun. 25, 2019, 16 pages.

*Primary Examiner* — Victor D Batson
*Assistant Examiner* — Matthew J Sullivan
(74) *Attorney, Agent, or Firm* — Dorsey & Whitney LLP

(57) ABSTRACT

A headphone or other wire holder including an elongated central body and a pair of forked portions, one on each end of the central body. Each forked portion may include two tines. The central body may define a retention channel running along a length of the central body between the forked portion. The retention channel may be configured to receive and secure a length of a wire, such as a headphone cable.

19 Claims, 18 Drawing Sheets

(56) References Cited

U.S. PATENT DOCUMENTS

| | | | |
|---|---|---|---|
| D568,254 S | 5/2008 | Patchett et al. | |
| D569,234 S | 5/2008 | Young | |
| D569,236 S | 5/2008 | Young | |
| D569,712 S | 5/2008 | Young | |
| 7,446,260 B2 * | 11/2008 | Hammonds | B65H 75/06 |
| | | | 174/135 |
| D589,899 S | 4/2009 | Huang et al. | |
| D596,128 S | 7/2009 | Hung et al. | |
| D617,741 S | 6/2010 | Fennell | |
| 7,748,665 B2 * | 7/2010 | Janesky | F04D 15/0218 |
| | | | 242/388.9 |
| 7,825,337 B2 | 11/2010 | Young | |
| D638,690 S | 5/2011 | Hoek | |
| D638,691 S | 5/2011 | Hoek | |
| D638,692 S | 5/2011 | Hoek | |
| D639,145 S | 6/2011 | Hoek | |
| D639,146 S | 6/2011 | Hoek | |
| D640,527 S | 6/2011 | Hoek | |
| D644,501 S | 9/2011 | Chen | |
| D657,869 S | 4/2012 | Mammen | |
| D668,620 S | 10/2012 | Convert et al. | |
| D680,851 S | 4/2013 | Lo | |
| 8,998,151 B2 | 4/2015 | Hoek | |
| D742,212 S | 11/2015 | Hsu | |
| D743,048 S | 11/2015 | Kuran | |
| D749,209 S | 2/2016 | Uhlenkamp et al. | |
| D767,500 S | 9/2016 | Byrne et al. | |
| D768,089 S | 10/2016 | Liu | |
| D773,414 S | 12/2016 | Hoffman | |
| D774,002 S | 12/2016 | Hsieh | |
| 9,618,143 B2 | 4/2017 | Noble | |
| D790,127 S | 6/2017 | Verleur | |
| D799,941 S | 10/2017 | Rothenberg et al. | |
| D802,168 S | 11/2017 | Lee | |
| D803,164 S | 11/2017 | Noble | |
| D805,879 S | 12/2017 | Garcia | |
| 9,949,011 B2 * | 4/2018 | Jen | H04R 5/033 |
| D822,122 S | 7/2018 | Bilezikian et al. | |
| D822,463 S | 7/2018 | Han | |
| 10,177,508 B2 * | 1/2019 | Boone | H04R 1/1033 |
| 2004/0118982 A1 | 6/2004 | Shillings et al. | |
| 2005/0189453 A1 | 9/2005 | Deguevara | |
| 2007/0235597 A1 | 10/2007 | Winchester | |
| 2016/0066076 A1 * | 3/2016 | Schatt | H04R 1/1033 |
| | | | 24/122.3 |
| 2017/0081145 A1 * | 3/2017 | Cayton | B65H 75/4473 |
| 2018/0109049 A1 | 4/2018 | Boone | |
| 2018/0338196 A1 * | 11/2018 | Freedman | H04R 1/1033 |

\* cited by examiner

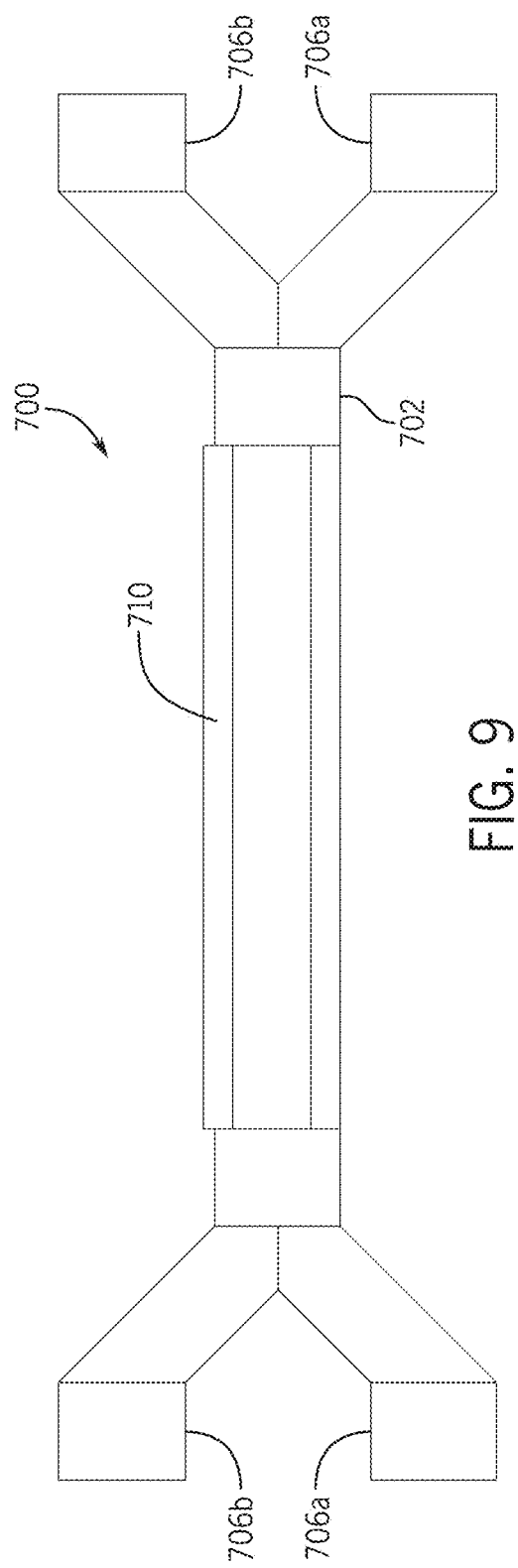
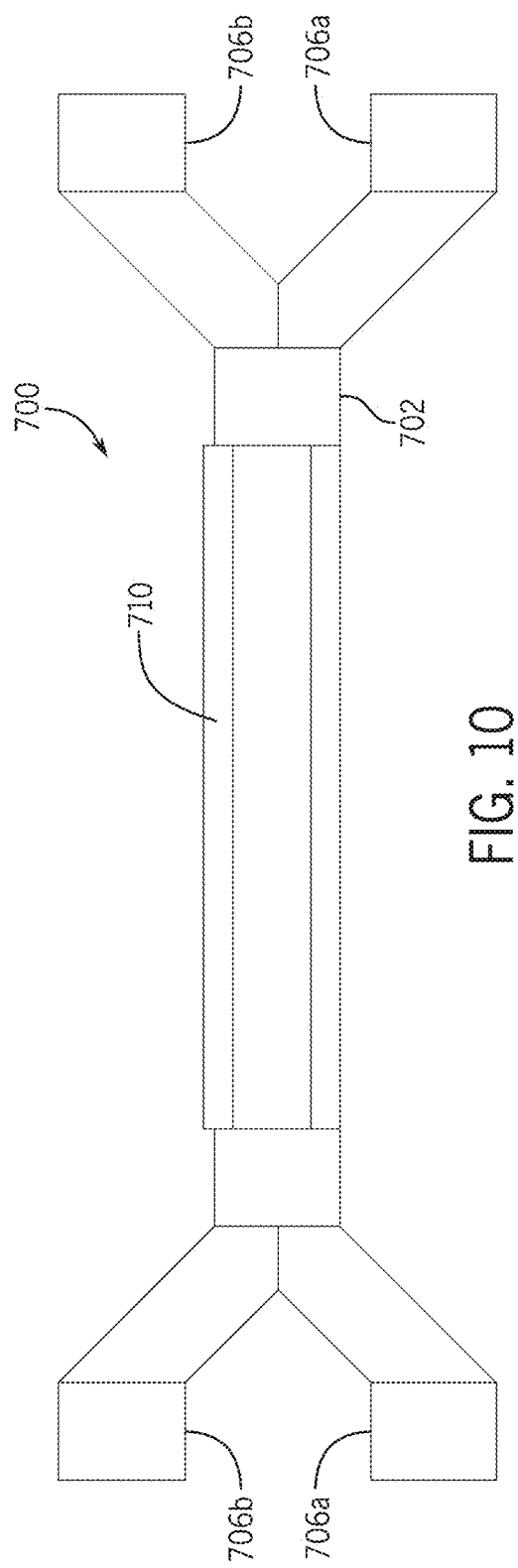

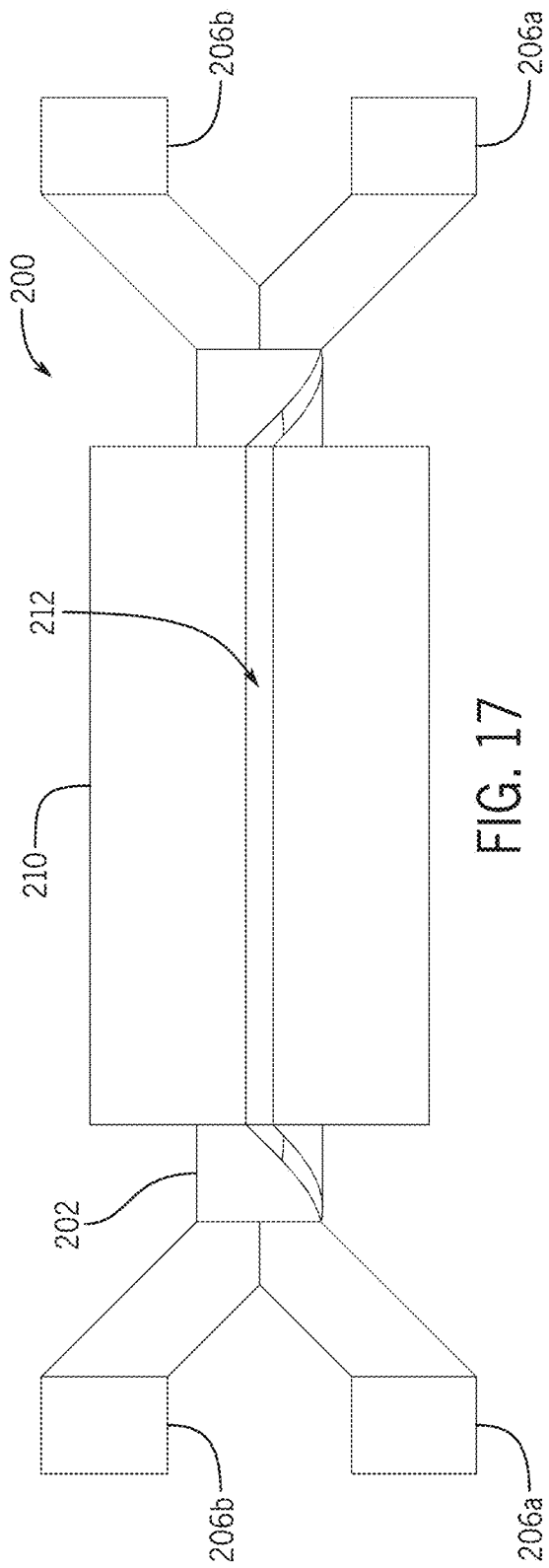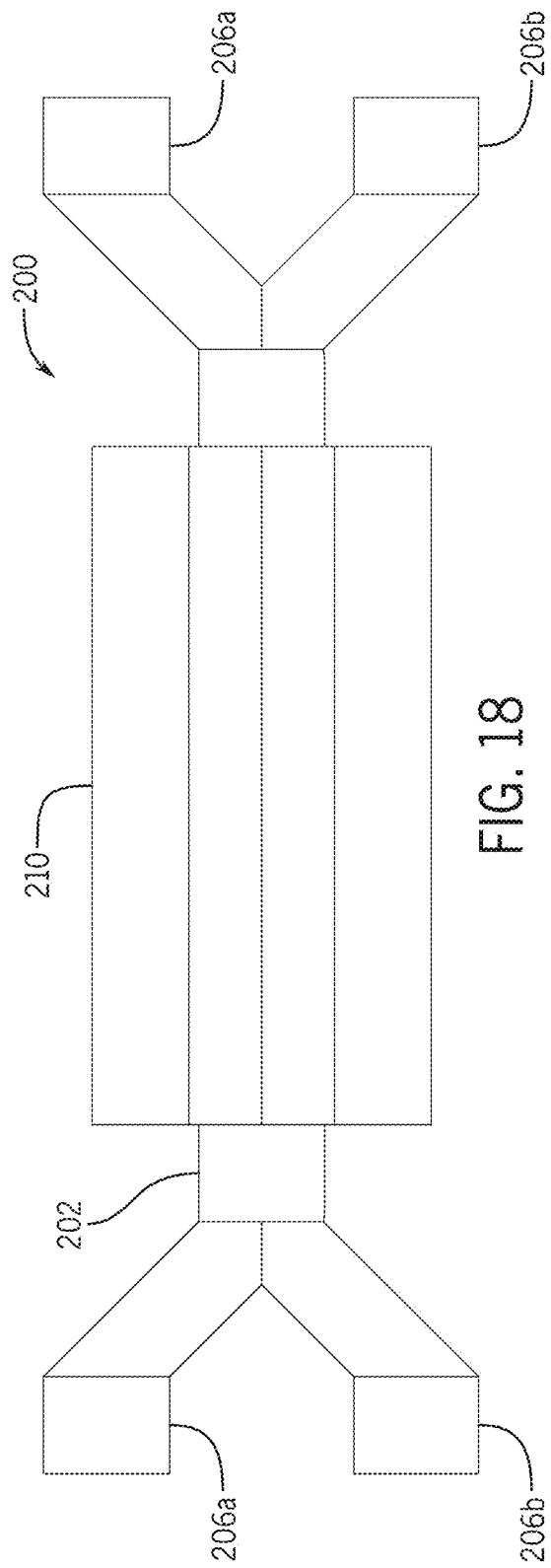

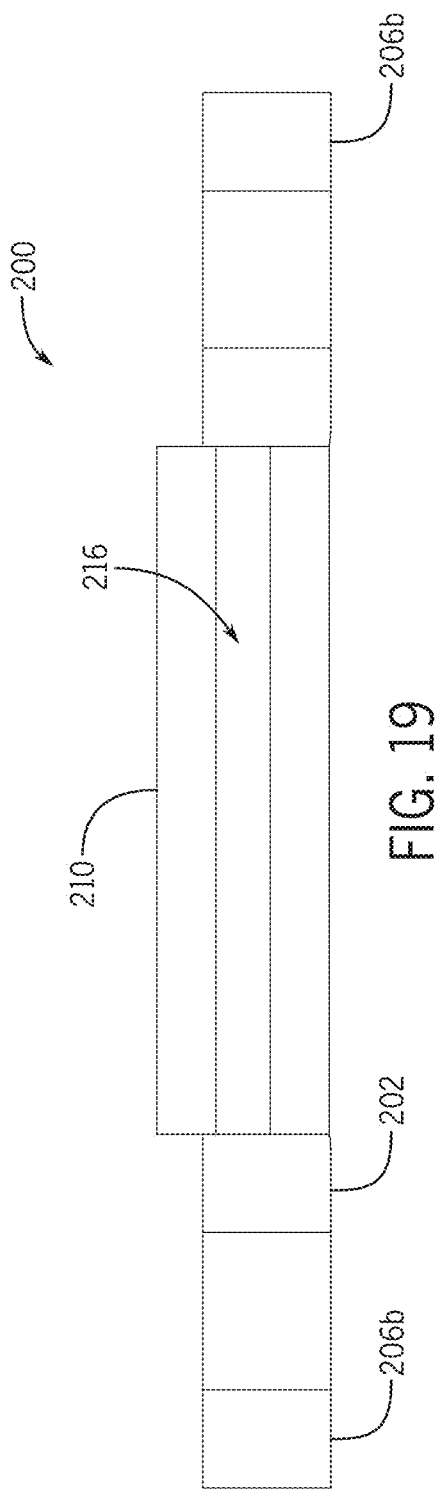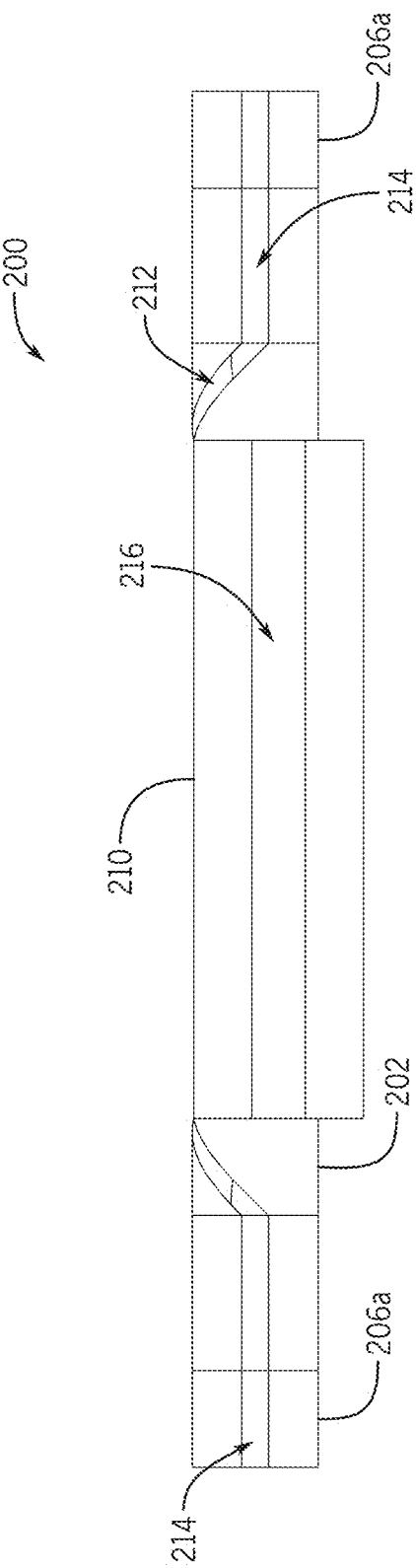

IN-LINE HEADPHONE CORD HOLDER

CROSS-REFERENCE TO RELATED APPLICATIONS

This application claims the benefit of priority under 35 U.S.C. § 119(e) of the earlier filing date of U.S. Provisional Patent Application No. 62/582,843 filed 7 Nov. 2017 and entitled "In-line headphone cord holder," which is hereby incorporated by reference in its entirety.

BACKGROUND

Headphone holders or wrapping devices provide a convenient storage and organization tool for managing cables of headphones, which can otherwise become knotted and tangled and lead to damage or difficulty arranging for use. Headphone holders or wrapping devices typically must be removed from the cord or cable of the headphones when they are not in use. This means that the headphone holder must be stored by the owner, such as in a purse or pocket, increasing the probability that the headphone holder will be lost or damaged.

The information included in this Background section of the specification, including any references cited herein and any description or discussion thereof, is included for technical reference purposes only and is not to be regarded subject matter by which the scope of the invention as defined in the claims is to be bound.

SUMMARY

According to one aspect of the present disclosure, a headphone holder is disclosed. The headphone holder includes an elongated central body and a forked portion comprising a plurality of tines on either end of the elongated central body, wherein the elongated central body includes a channel running along its length between the forked portions and configured to receive and secure a headphone cable. An earbud holder is attached longitudinally along the central body and defines storage channels sized for receipt and storage of headphone earbud.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

BRIEF DESCRIPTION OF THE DRAWINGS

FIGS. 7-24 illustrate various views of additional embodiments of the headphone holder of the present disclosure.

DETAILED DESCRIPTION

Several example embodiments of an in-line headphone or other wire holder are disclosed herein. By providing a holder secured in-line when the headphones or other retained wires are in use, a user may not need to worry about losing or storing the headphone holder when the headphones are in use, i.e., the holder can remain in position while the user is utilizing the headphones, eliminating the need for the holder to be removed and stored before use of the headphones. Moreover, the embodiments disclosed herein provide additional benefits including a secure channel for holding the headphone cable, earbud holders for securely retaining earbuds when not in use, and a compact, easy-to-use design for wrapping and storing headphones. The headphone holder may include a central elongated body that supports a holding platform including a plurality of retention grooves or channels defined thereon. The holding platform may be positioned such that a central axis of the platform is parallel to and aligned with the central axis of the central body. In other embodiments, the holding platform may be offset from the central axis of the central body but parallel thereto, e.g., extending from a sidewall adjacent to the central body. The various configurations of the holding platform allow the headphone or other wiring retention elements to be easily varied based on the application, type of wires held by the holder platform, and/or user preference.

Additionally, the headphone holder platform includes retention grooves that are parallel to the central axis of the central body to ensure that the wires are retained in-line with the length of the holder. The retention grooves may include overhang portions that partially cover the grooves. These overhang features help to retain the wires within the grooves, but allow a user to easily insert and remove the wires when desired.

Figure 1A:
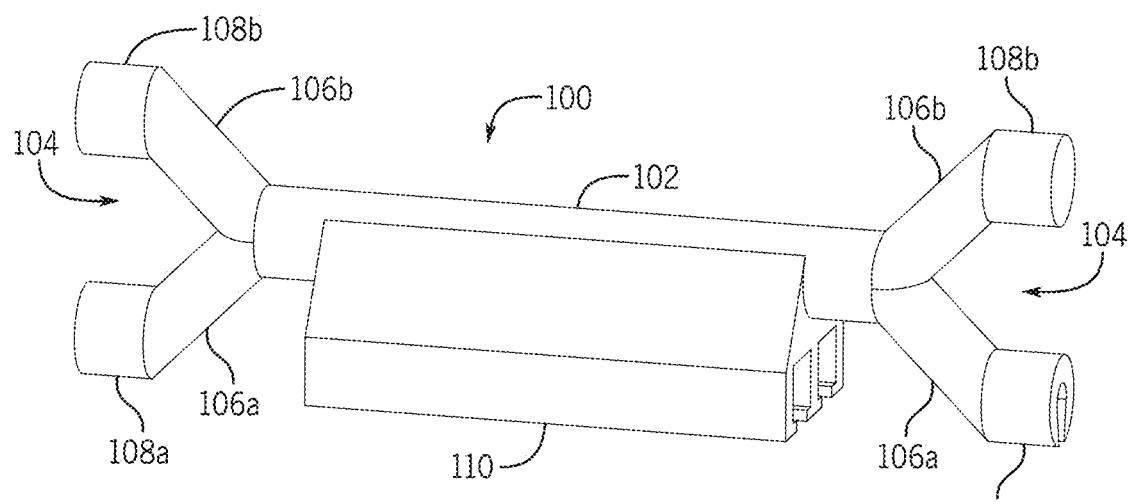
FIGS. 1A-1D are views of an in-line headphone holder having adjacent and centered earbud holders.

FIG. 1A is a side elevation view of an in-line headphone holder 100 having adjacent and centered earbud holders. The headphone holder 100 may generally be made of any suitable material, such as plastic, rubber, or metal. In various embodiments, the headphone holder 100 may be made of a semi-rigid, resilient material that provides limited flexing capabilities, which may provide for appropriate functionality and/or durability as discussed in further detail below. Additionally, the headphone holder may be formed as a monolithic structure, e.g., by injection molding of plastics or rubbers or by machining a desired form out of a block of material, three-dimensional printing, or three-dimensional imaging.

As shown in FIG. 1A, the headphone holder 100 includes an elongated, shaft-like central body 102 and a Y-shaped or forked portion 104 at each end of the central body 102. The forked portions 104 each include two tines 106a/b. The tines 106a/b on each end of the central body 102 extend outward from the central body 102 at opposing angles from a longitudinal axis of the central body 102. The angle and positioning of the tines 106a/b may be varied as desired. The opposing angles of the tines 106a/b may be symmetrical or asymmetrical. The tines 106a/b may further extend distally to form end portions 108a/b that are parallel to the longitudinal axis of the central body 102. As explained below, the tines 106a/b may be shaped or otherwise configured to facilitate holding of a headphone cable. For example, the angle and positioning of the tines 106a/b relative to the central body 102 may provide sufficient grip on the headphone cable to, for example, limit undesired sliding of the headphone holder 100 along the cable. Though shown as extending from the central body 102 in a Y-shaped or forked configuration, one or more of the tines 106a/b may extend from the central body 102 in other configurations, such as axially along the same longitudinal axis, perpendicular to the longitudinal axis of the central body 102, at a non-parallel and non-perpendicular angle to the longitudinal axis of the central body 102, or the like. Additionally or alternatively, the tines 106a/b may curve and/or include linear segments along at least a portion of their lengths.

Figure 1B:
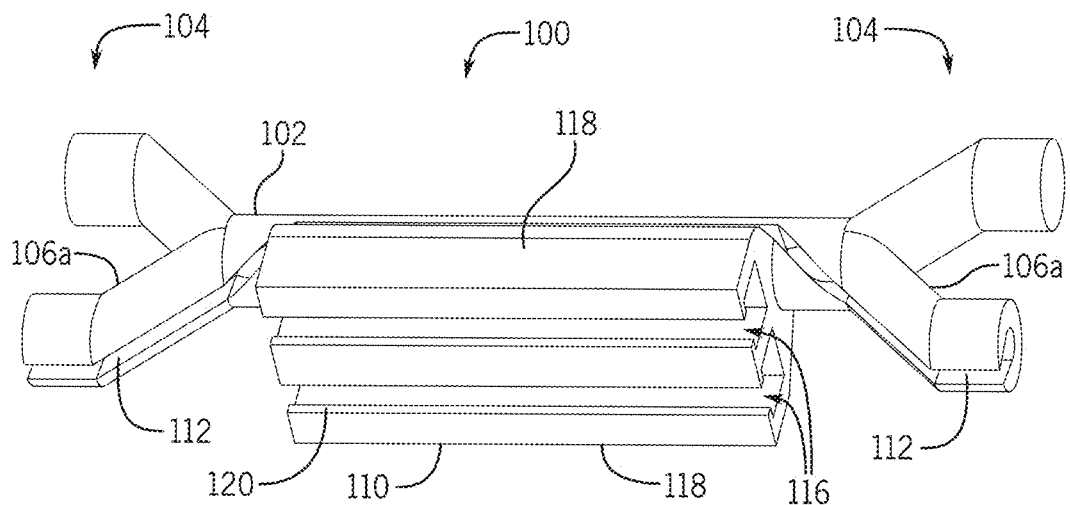
Figure 1C:
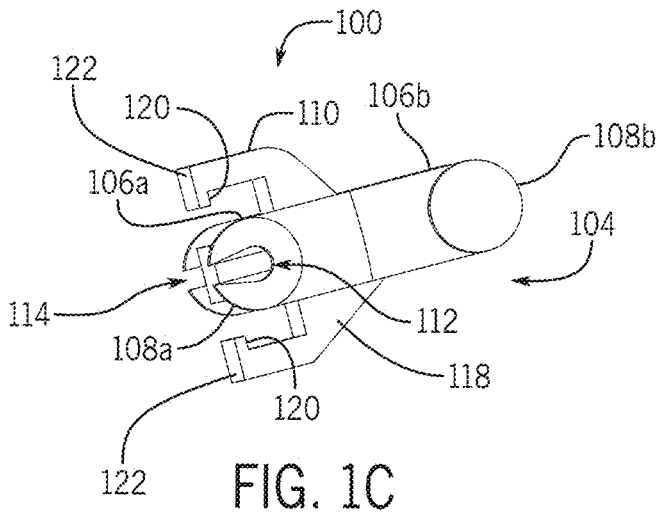
Figure 13:
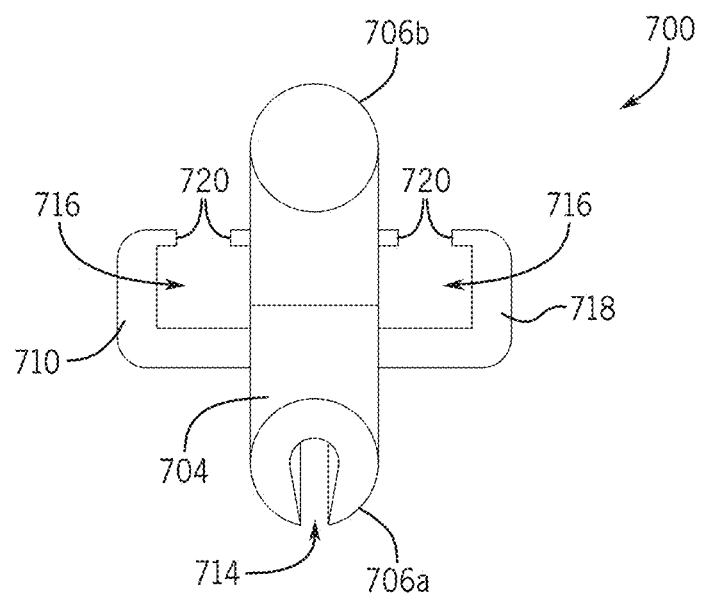
Figure 14:
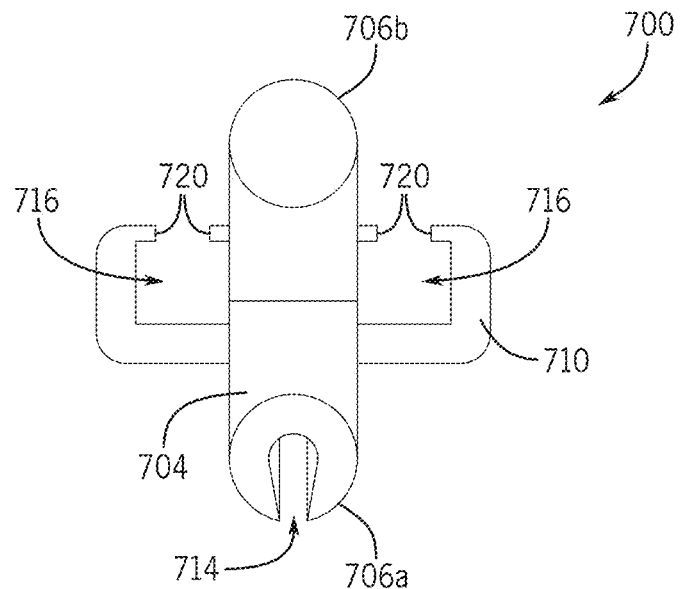

The headphone holder 100 may further include an earbud holder 110 positioned along the shaft of the central body 102. As shown, the earbud holder 110 extends from an outer surface of the central body 102. Depending on the particular application, the earbud holder 110 may extend from the central body 102 at an angle towards one of the tines 106a/b. For instance, as shown in FIG. 1C, the earbud holder 110 may extend from the central body 102 and towards the tines 106a. Though FIGS. 1A-1C illustrate the earbud holder 110 angled away from the central body 102, other configurations are contemplated, including configurations where the earbud holder 110 extends generally perpendicularly away from a plane defined by the tines 106a and 106b (see FIGS. 13-15, for example). As discussed in further detail below, the earbud holder 110 may receive earbuds of a set of headphones and securely hold them for storage.

FIG. 1B is a side isometric view of the headphone holder 100 of FIG. 1. As shown in FIG. 1B, two of the tines 106a on the same lateral side of the headphone holder 100 may include a portion of a retention channel 112. The retention channel 112 is sufficiently wide to receive a headphone cable. Because of the inclusion of the retention channel 112, the tines 106a may be larger in cross-sectional dimension than the opposing tines 106b on the forked portions 104. As shown in FIG. 1D, the retention channel 112 may run from an end of one tine 106a, along the central body 102, and to the end of a second tine 106a at the opposite end of the central body 102. An end view of the forked portion 104 is shown in FIG. 1C. The end portion 108a of a tine 106a with the retention channel 112 formed therein is shown. The retention channel 112 may be substantially or partially cylindrical and extend along the length of the tines 106a as a conduit therein.

Depending on the particular application, the retention channel 112 may be shaped to sufficiently grip and/or retain a headphone cable positioned therein. For instance, the retention channel 112 may be shaped to include a decreasing opening space, such as having a teardrop-shaped cross-section as shown in FIG. 1C. In some examples, the decreasing opening space of the retention channel 112 may be defined by a sidewall or shelf of the central body 102 and/or tine 106a. For instance, a sidewall or shelf of the central body 102 and/or tine 106a may define a longitudinal slot 114 for receiving the headphone cable that connects with the retention channel 112. The decreasing opening space of the retention channel 112 may or may not continue along the central body 102. In particular, the portion of the retention channel 112 extending along the central body 102 may have a wider longitudinal opening for direct insertion of a headphone cable. Additionally or alternatively, the sidewall or shelf defining the decreasing opening space of the retention channel 112 may be continuous or discontinuous along the length of the retention channel 112. As shown in FIG. 1B, the retention channel 112 may jog from the tines 106a around the earbud holder 110 along the shaft of the central body 102. The jogging of the retention channel 112 along the length of the headphone holder 100 may increase grip on the portion of a headphone cable positioned within the retention channel 112, thereby limiting undesired sliding of the headphone holder 100 along the cable.

As discussed above, the headphone holder 100 may be semi-rigid, yet resilient or pliant and a width of the longitudinal slot 114 may be narrower than the diameter of the retention channel 112. However, by taking advantage of the resiliency of the material forming the headphone holder 110, a width of the slot 114 may be expanded to admit a headphone cable and, once a headphone cable is inserted into the retention channel 112, the slot 114 may be released and return to its normal width to secure the headphone cable within the retention channel 112. Also, in this way, the headphone holder 100 is likewise secured to a set of headphones and is less likely to become lost or misplaced.

Returning again to FIG. 1B, the earbud holder 110 may extend parallel with the axis of the central body 102 and connected along the length of the central body 102. The earbud holder 110 may include many configurations and shapes. For instance, the earbud holder 110 may be generally shaped as a rectangular block as shown in FIG. 1B, though other shapes are contemplated. The earbud holder 110 may define two parallel storage channels 116 along its length for receiving stems of and/or cables attached immediately adjacent to earbuds of a set of headphones. The storage channels 116 may be defined in various locations on the earbud holder 110. For example, the storage channels 116 may be defined on top, bottom, or side surfaces of the earbud holder 110. The storage channels 116 may be symmetrical across the headphone holder 100 or may be shaped and/or positioned asymmetrically. For example, the earbud holder 110 may extend from the central body 102 in a symmetrical configuration relative to the longitudinal axis of the central body 102 and/or midplane of the central body 102 and tines 106a/b. Alternatively, the earbud holder 110 may extend asymmetrically relative to the longitudinal axis of the central body 102 and/or midplane of the central body 102 and tines 106a/b.

As with the retention channel 112 and the slot 114, the earbud holder 110 may define sidewalls 118 that can flex under pressure to admit the earbud stems and/or cables into the storage channels 116. To help retain the earbud stems and/or cables within the storage channels 116, the earbud holder 110 may be curved or otherwise arranged to sufficiently grip and/or retain the earbud stems and/or cables within the storage channels 116. For example, the earbud holder 110 may include shelves 120 extending from the sidewalls 118. The shelves 120, which may be referred to as overhangs or overhang portions, may extend from terminal end portions 122 of the sidewalls 118. In one example, the shelves 120 may extend toward each other to at least partially encapsulate the earbud stems and/or cables within the storage channels 116. The shelves 120 may be continuous or discontinuous along their lengths. In some examples, the storage channels 116 may include a decreasing opening space similar to the retention channel 112. In particular, the storage channels 116 may have a teardrop-shaped cross-section or the like.

Figure 1D:
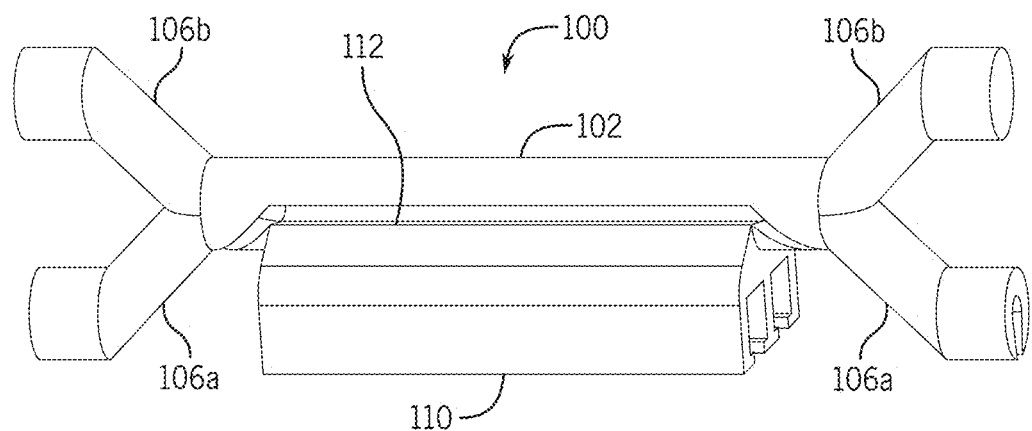

As shown in FIG. 1D, the earbud holder 110 may be attached to the central body 102 at a seam along a line that is parallel to and between the two storage channels 116. The retention channel 112 may extend along the central body 102 adjacent to the connection seam of the earbud holder 110 and the central body 102. The earbud holder 110 provides a compact and secure way to store headphones without the risk that the headphones will become tangled, dislodged, or damaged during storage.

The earbud holder 110 may be positioned central to the longitudinal axis of the central body 102 or offset therefrom. For instance, the earbud holder 110 may be aligned with the longitudinal axis of the central body 102 such that the longitudinal axis of the central body 102 is coextensive with a midline of the earbud holder 110. Additionally or alternatively, the longitudinal axis of the central body 102 may be coextensive with a plane defined by the earbud holder 110. In alternative examples, the earbud holder 110 may be offset away from the longitudinal axis of the central body 102. For example, the longitudinal axis of the central body 102 may be spaced away from the midline of the earbud holder 110.

In operation, a headphone cable may be inserted into the retention channel 112 from one end portion 104 to the other end portion 104. When the headphones are in use, the retention channel 112 may hold the headphone holder 100 in in connection with the headphone cable by friction between, or partial enclosure of, an interior surface of the retention channel 112 and the headphone cable. When the headphones are not in use, the earbuds may be inserted into the storage channels 116 of the earbud holder 110 and the remainder of the headphone cable may be wound around the headphone holder 100. For example, the headphone cable may be held between the tines 106a/b and wound from one end portion 104 to the other end portion 104 until the headphone cable is entirely wound around the headphone holder 100.

Figure 2A:
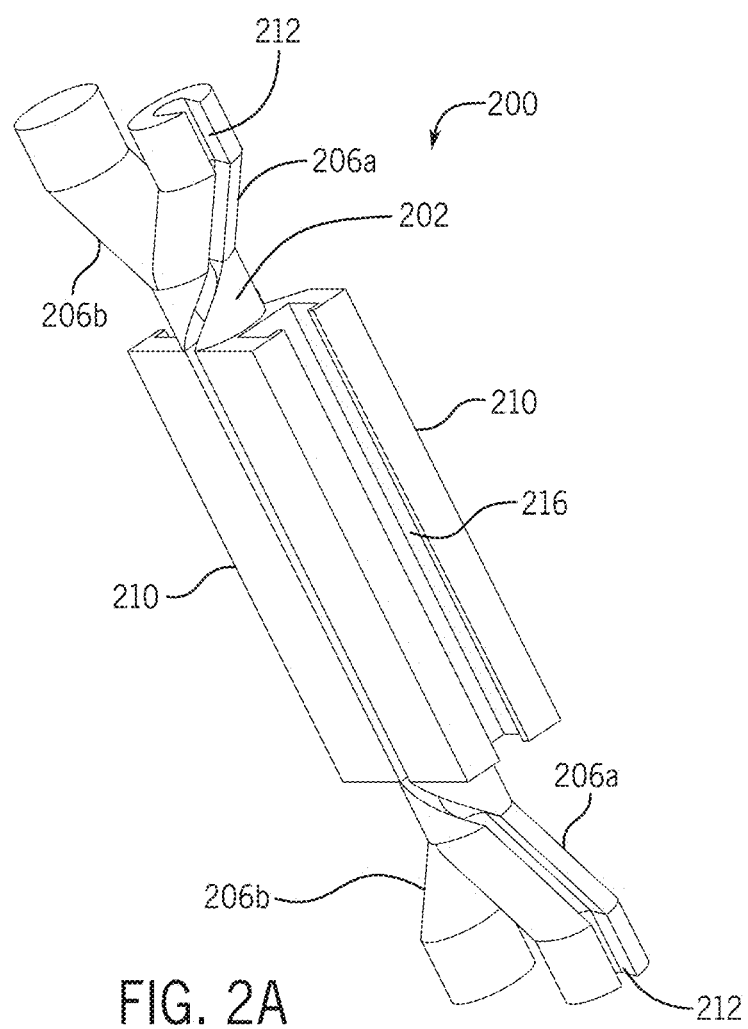
FIGS. 2A-2B are views of an in-line headphone holder having laterally separated earbud holders.
Figure 2B:
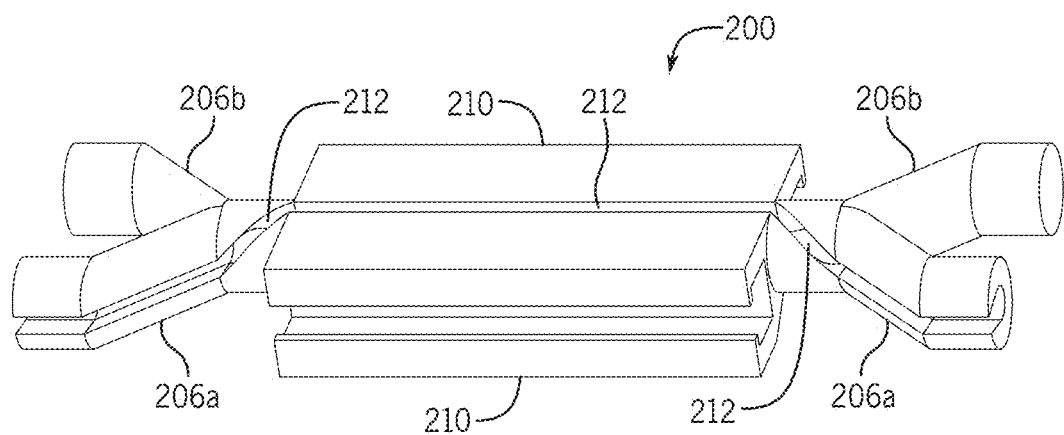

FIG. 2A is a perspective isometric view of an in-line headphone holder 200, similar in form to the headphone holder 100 of FIGS. 1A-1D, but having laterally separated earbud holders 210. In the embodiment of FIG. 2A, the earbud holders 210 are positioned on opposite sides of the central body 202. By positioning the earbud holders 210 on opposite sides of the central body 202, the embodiment of FIG. 2A may enable a headphone cable to be wrapped more compactly around the central body 202 between the tines 206a/b than the embodiment of FIGS. 1A-1D because the earbuds are held in storage channels 216 out of the area in which the headphone cable is wrapped. FIG. 2B is a side elevation view of the in-line headphone holder 200 of FIG. 2A. As shown in FIG. 2B, the retention channel 212 may extend along the length of the central body 202 between the two storage channels 216 of the earbud holder 210. The retention channel 212 may then extend through a tine 206a on each end of the headphone holder 200 as described above with respect to FIGS. 1A-1D.

Figure 3A:
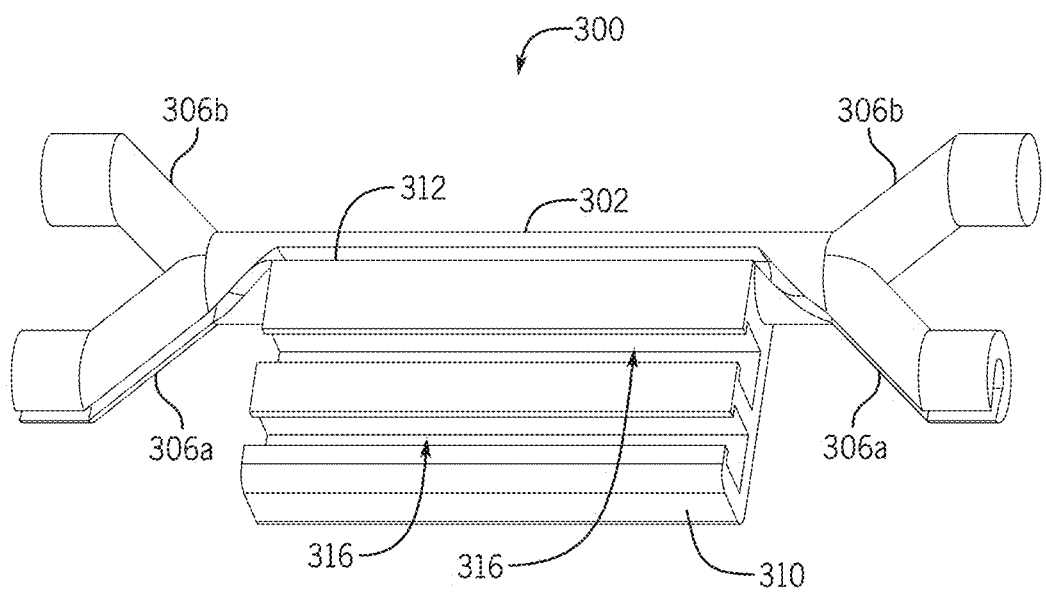
FIGS. 3A-3C are views of an in-line headphone holder having adjacent and offset earbud holders.
Figure 3B:
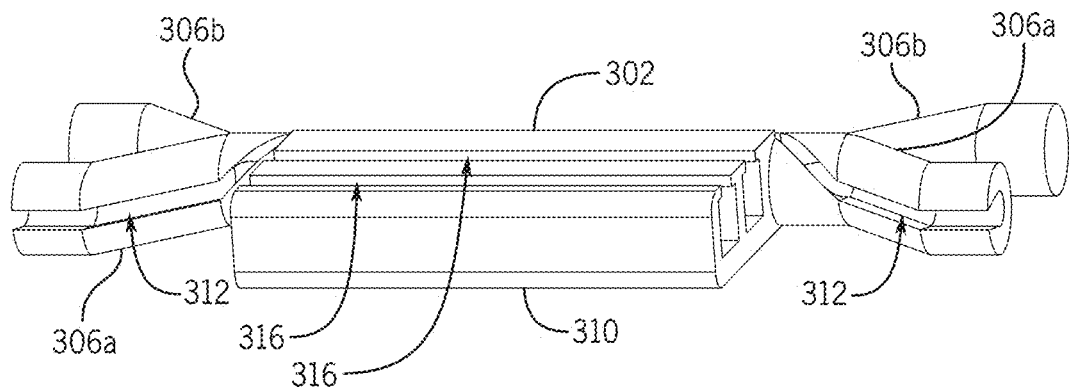
Figure 3C:
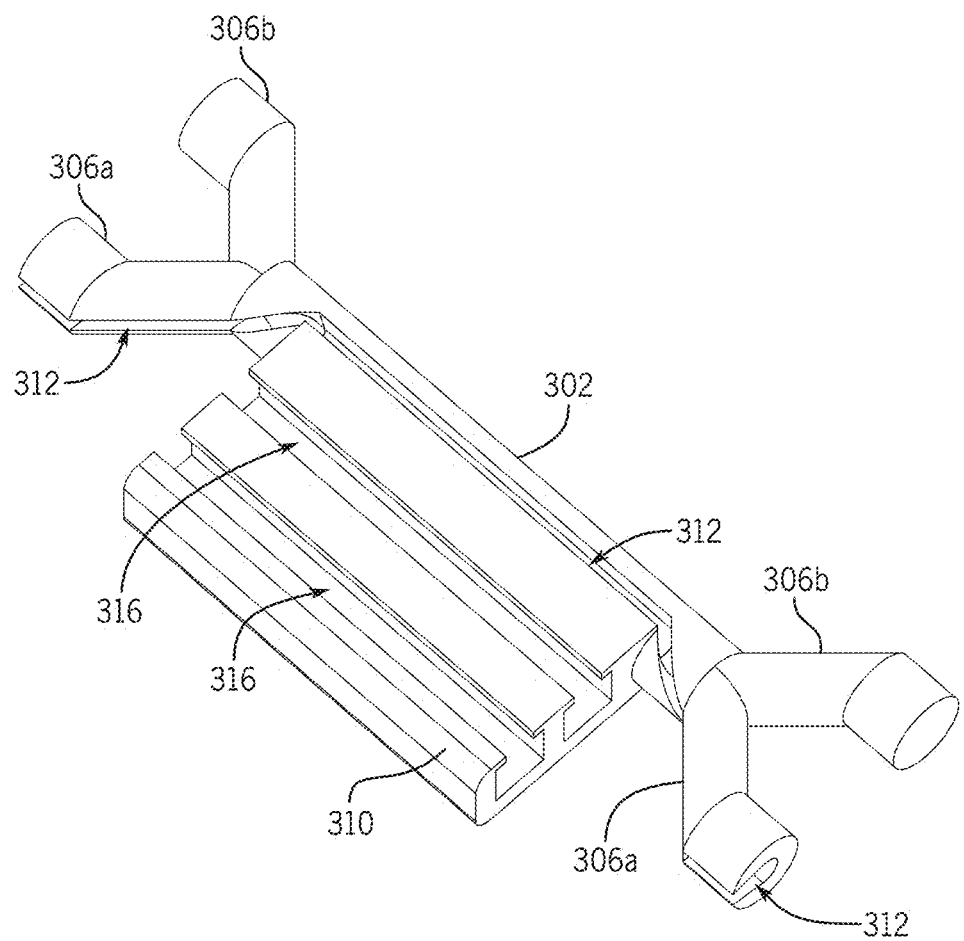

FIG. 3A is a side elevation view of an in-line headphone holder 300 having adjacent and offset earbud holders 310. FIGS. 3B and 3C are isometric views of the in-line headphone holder 300 of FIG. 3A. In the embodiment of FIGS. 3A-3C, storage channels 316 of the earbud holder 310 are positioned adjacent to one another similarly as in the embodiment shown in FIGS. 1A-1D. However, rather than attaching the earbud holder 310 at a center line between the storage channels 316 (as shown in FIG. 1B with respect to storage channels 116), the earbud holder 310 may be affixed to the central body 302 along an outer edge of the earbud holder 310. By positioning the earbud holder 310 in this manner, the embodiment of FIGS. 3A-3D may enable a headphone cable to be wrapped more compactly than the embodiment of FIGS. 1A-1D because the earbuds are held out of the area in which the headphone cable is wrapped. As shown in FIG. 3C, the retention channel 312 may extend through two of the tines 306a as described above with respect to FIGS. 1A-1D and further extend within and along the central body 302 adjacent to the connection seam between the central body 302 and the earbud holder 310.

Figure 4:
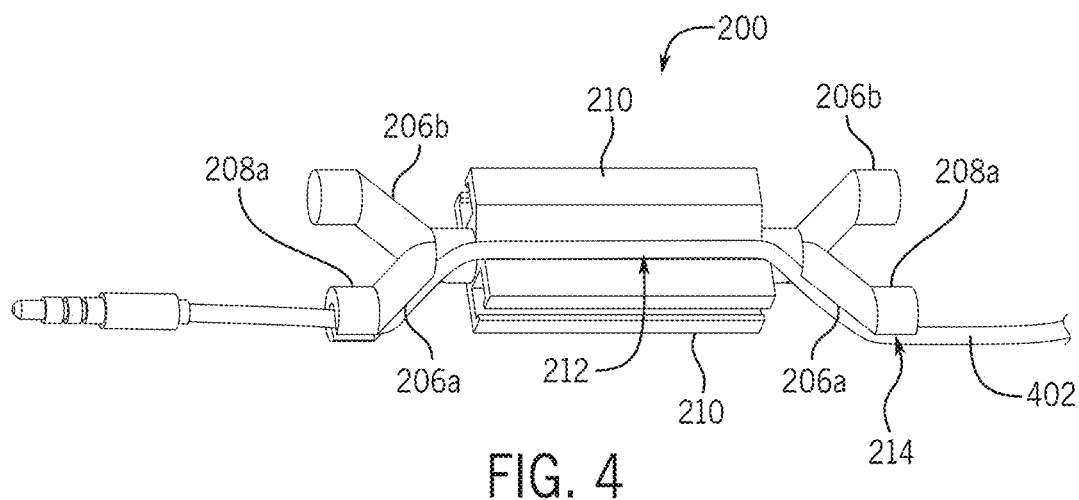
FIG. 4 depicts the in-line headphone holder of FIGS. 2A-2B operably coupled a headphone cable.

FIG. 4 depicts the in-line headphone holder 200 of FIGS. 2A-2B operably coupled to a headphone cable 402. As shown in the embodiment of FIG. 4, the headphone cable 402 may be inserted into the channel 212 through the opening 214. The headphone cable 402 may extend from one end portion 208a along the channel 212 between the earbud holders 210 to the end portion 208a of a tine 206a at the opposite end of the headphone holder 200. Because the headphone holder 200 may be made of material that is semi-rigid, the opening 214 may expand to receive the headphone cable 402 and then contract once the headphone cable 402 is inserted to provide pressure against the headphone cable 402 and hold it in place.

Figure 5A:
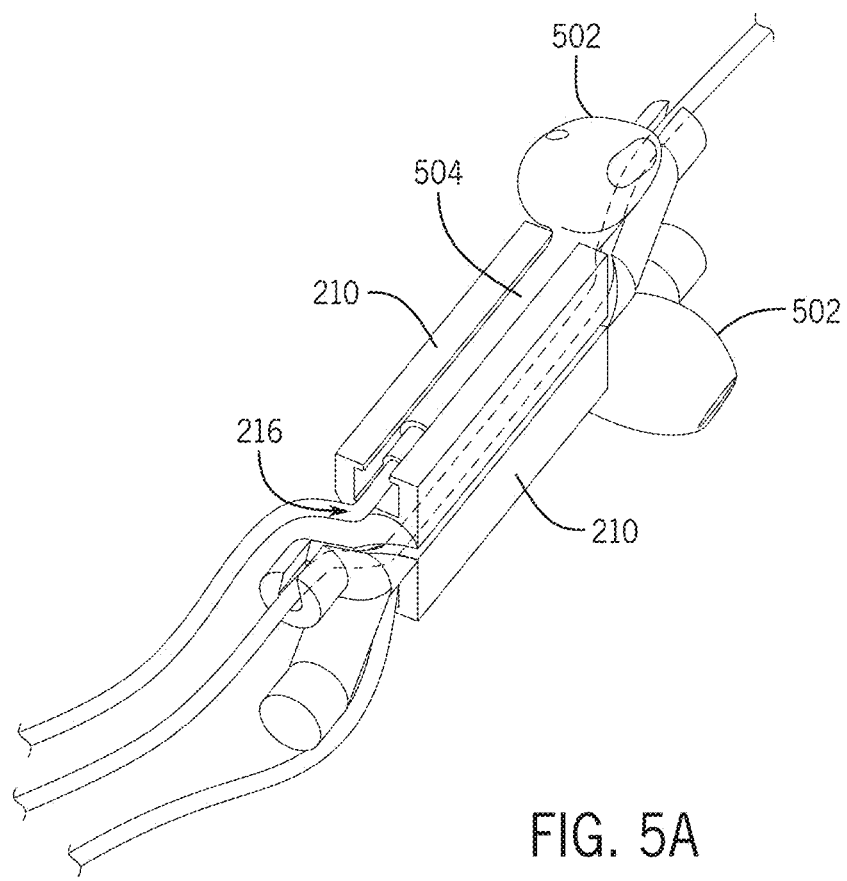
FIG. 5A depicts the in-line headphone holder of FIGS. 2A-2B operably coupled to earbuds.

FIG. 5A depicts the in-line headphone holder 200 of FIGS. 2A-2B operably coupled to earbuds 502. The earbud holders 210 may include storage channels 216 on either side of the central body 202 for receiving the earbuds 502. In some embodiments, the earbuds 502 may include a stem 504 that may be inserted into the storage channels 216. Because the headphone holder 200 may be made of material that is resiliently pliable, the storage channels 216 may expand to receive the stems 504 and then contract once the stems are inserted to provide pressure against the stems 504 and hold the earbuds 502 in place.

Figure 5B:
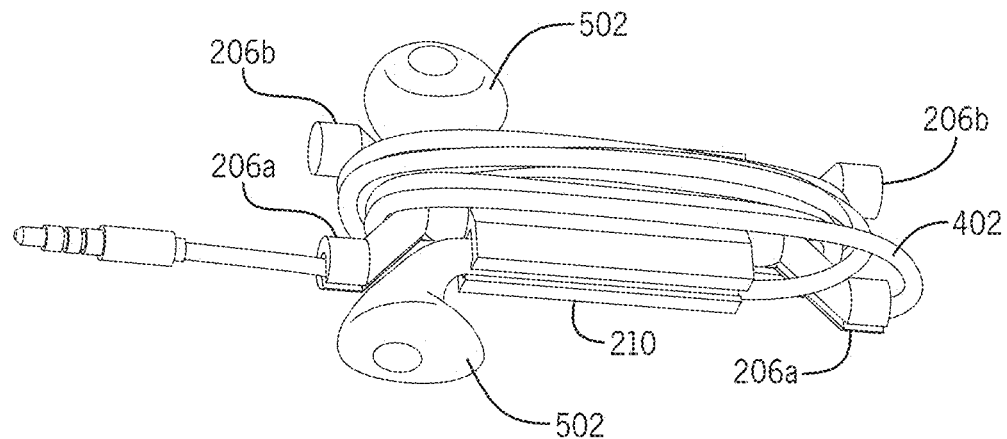
FIG. 5B depicts the in-line headphone holder of FIGS. 2A-2B having a headphone cable wrapped therearound.

FIG. 5B depicts the in-line headphone holder 200 of FIGS. 2A-2B with the earbud stems 504 retained within the storage channels 216 and having the headphone cable 402 wrapped around the forked portions 204. Once the headphone cable 402 is secured within the channel 212, the excess length of the headphone cable 402 between the plug and the earbuds 502 may be wrapped around the headphone holder 200 by wrapping the cable between the tines 106a/b at each end of the central body 202 until the headphone cable 402 is completely wrapped around the headphone holder 200. The earbuds 502 may then be secured within the earbud holders 210 to ensure that the headphone cable 402 does not become unwound during storage of the headphones.

Figure 6:
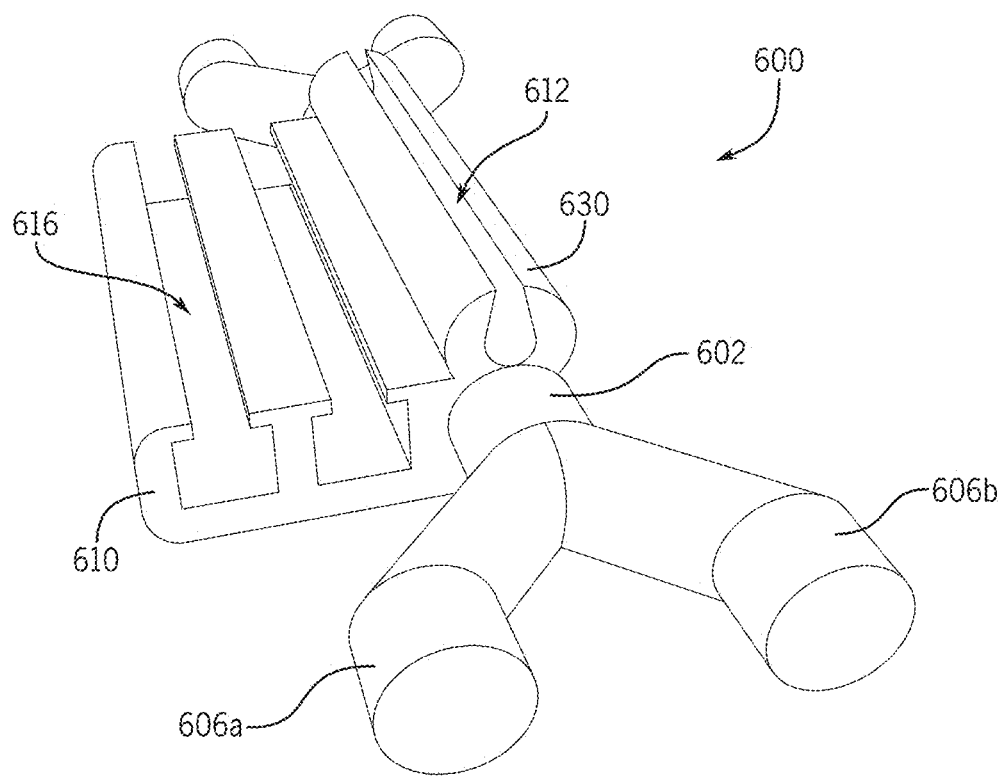
FIG. 6 is a perspective view of an in-line headphone holder according to an additional embodiment of the present disclosure.
Figure 7:
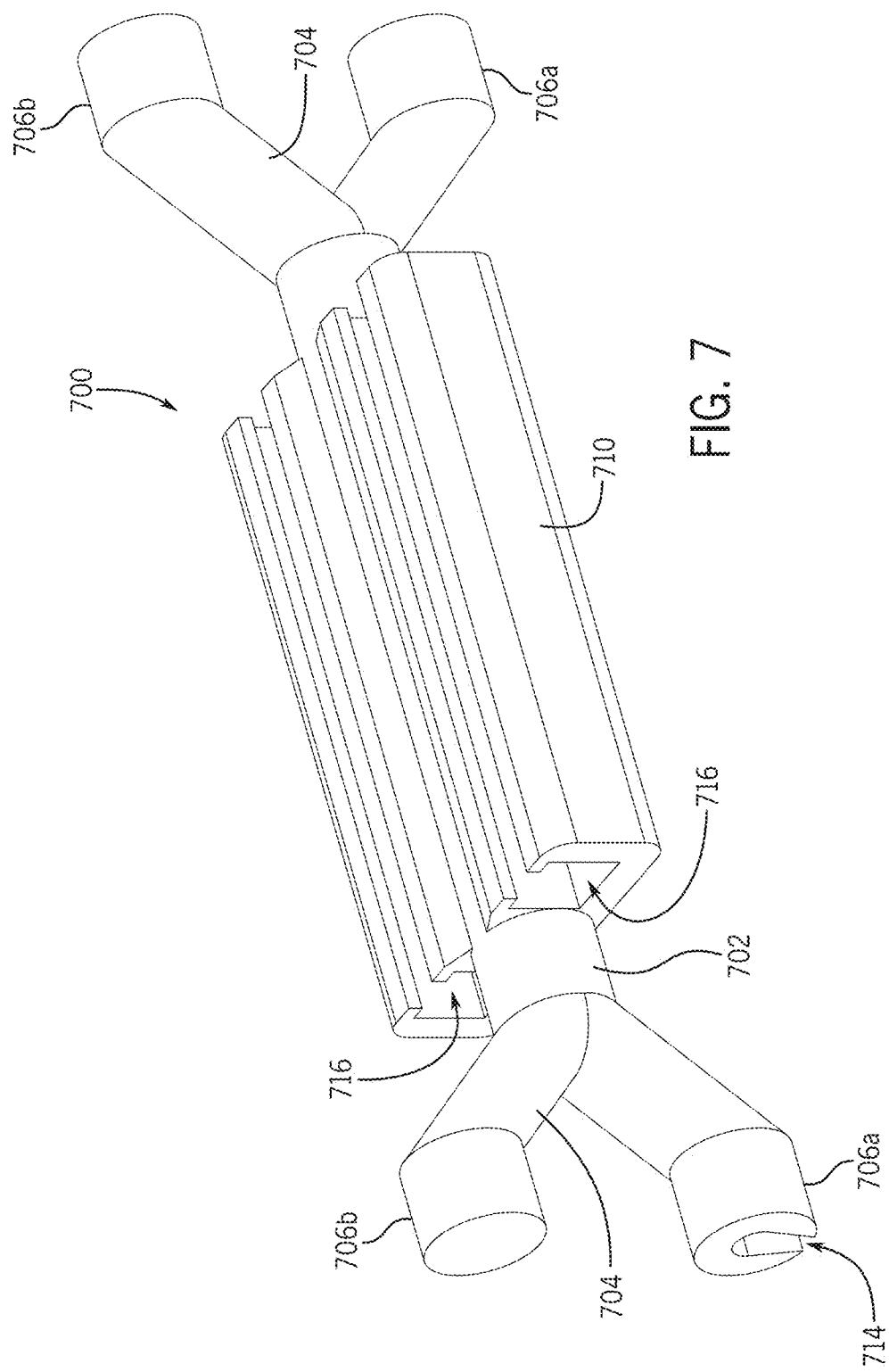
Figure 8:
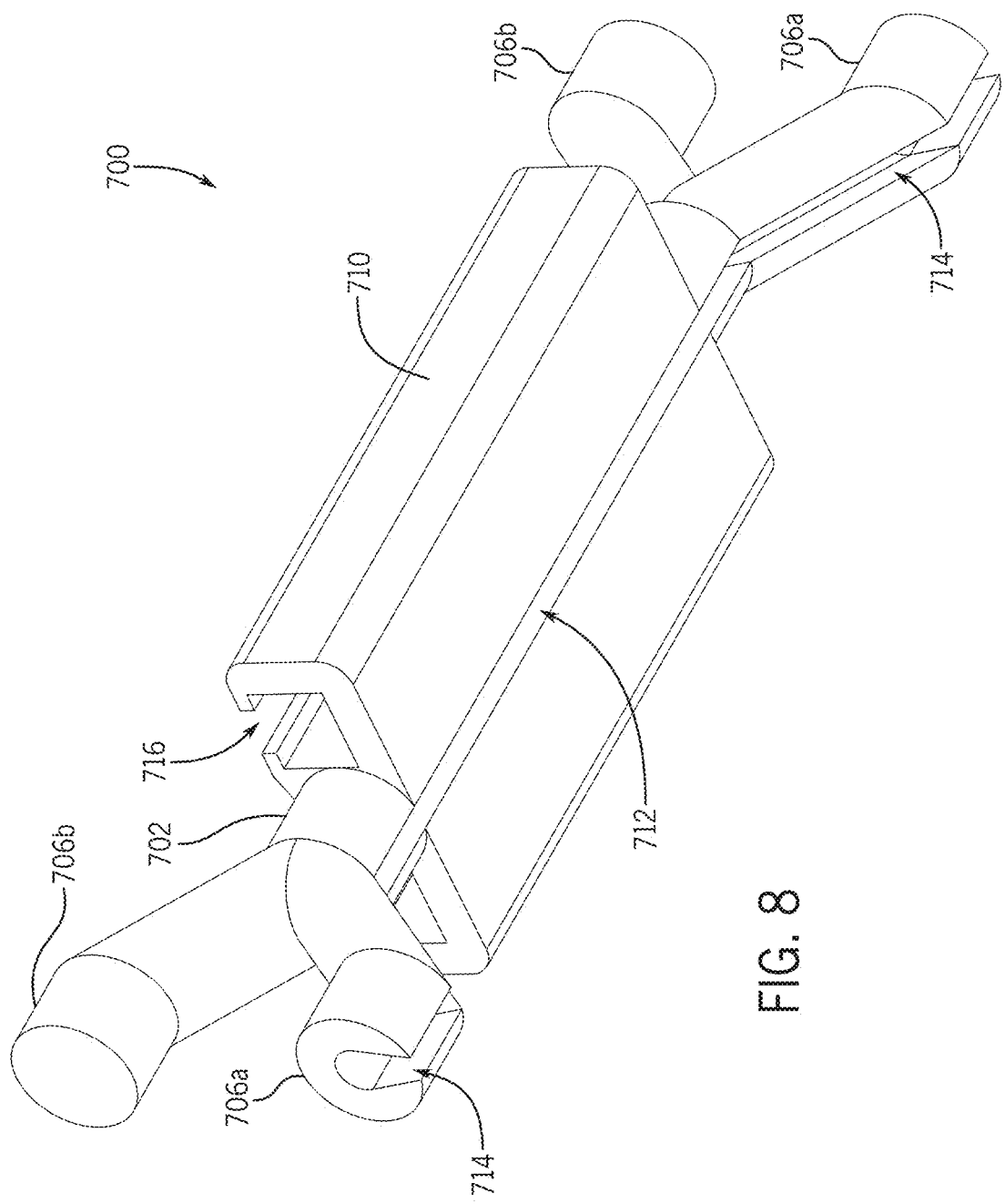
Figure 11:
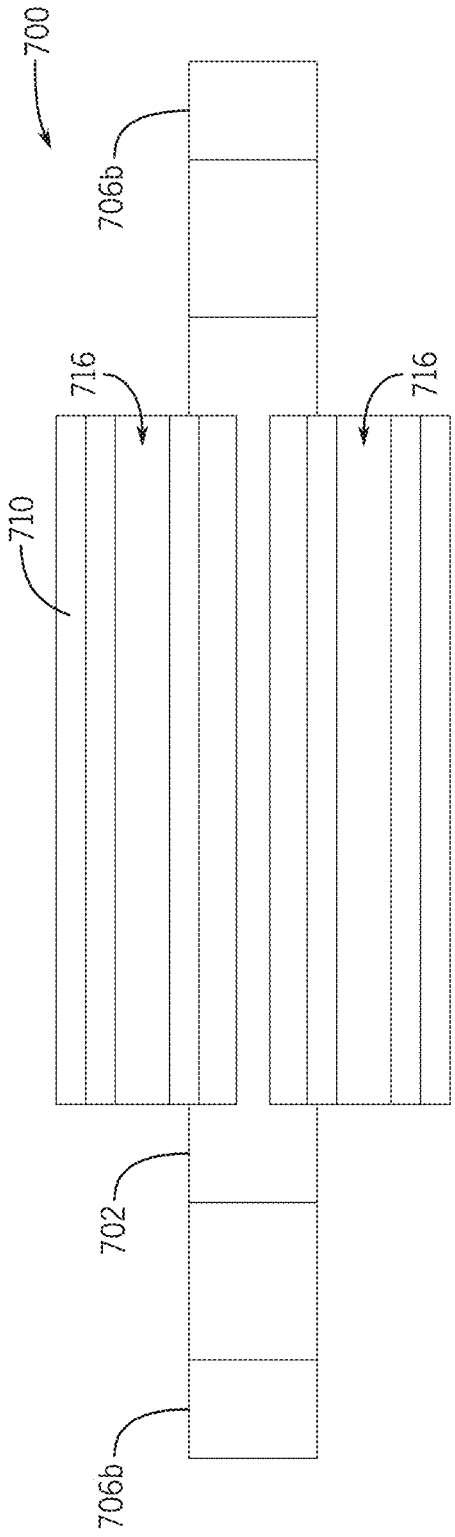
Figure 12:
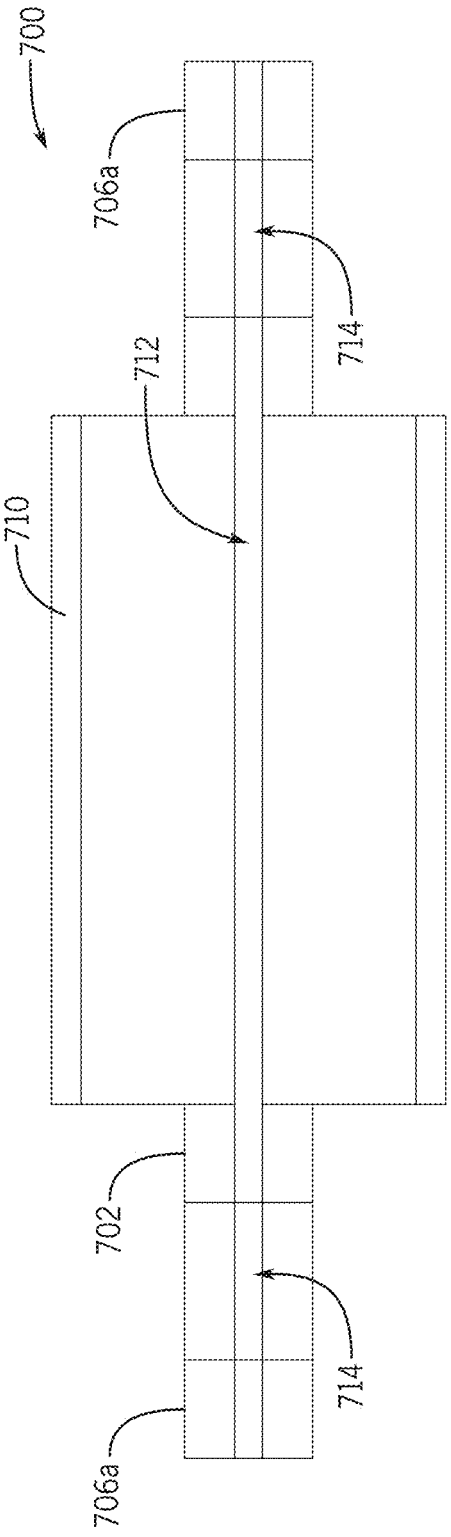

FIG. 6 is a perspective isometric view of an in-line headphone holder 600, similar in form to the headphone holder 300 of FIGS. 3A-3C, but having a retention channel 612 offset from the central body 602. For example, the retention channel 612 may be defined by an elongated secondary body 630 connected to the central body 602. The secondary body 630 may extend along the central body 602. Depending on the particular application, the secondary body 630 may extend parallel to or substantially parallel to the central body 602. In this way, the retention channel 612 may extend parallel to or substantially parallel to the longitudinal axis of the central body 602 in a spaced apart relationship. As shown in FIG. 6, the secondary body 630 may extend along a length of the central body 602, such as partly along the length of the central body 602, along the entire length of the central body 602, or otherwise. As such, the retention channel 612 may not be formed within or along the tines 606a/b. The secondary body 630 may offset the retention channel 612 in any direction from the central body 602. For example, the secondary body 630 may be sized and shaped to offset the retention channel 612 in a direction opposite the earbud holder 610, in a direction substantially perpendicular to a plane defined by the earbud holder 610, in a direction towards the earbud holder 610, or the like. In such embodiments, the length of the retention channel 612 may be open in the same direction as the storage channels 616, in a direction opposite to the storage channels 616, or in a direction substantially perpendicular to the storage channels 616, among others.

FIGS. 7-14 depict various views of an in-line headphone holder 700. Except as otherwise noted below, the headphone holder 700 is similar in form to the headphone holder 100 of FIGS. 1A-1D. As shown in FIGS. 7-14, the headphone holder 700 includes a central body 702, a forked portion 704 with a pair of tines 706a/b at each end of the central body 702, and an earbud holder 710 connected to the central body 702. In the examples illustrated in FIGS. 7-14, the headphone cable may be inserted along a side of the headphone holder 700 opposite the storage channels 716 of the earbud holder 710. In particular, the tines 706a may define a first side of the headphone holder 700, with the tines 706b defining an opposite second side. In such examples, the slots 714 for receiving the headphone cable in the tines 706a may be defined on the first side of the headphone holder 700, with the storage channels 716 defined on the second side of the headphone holder 700. The retention channel 712 may extend along the central body 702 on the first side of the headphone holder 700.

Figure 15:
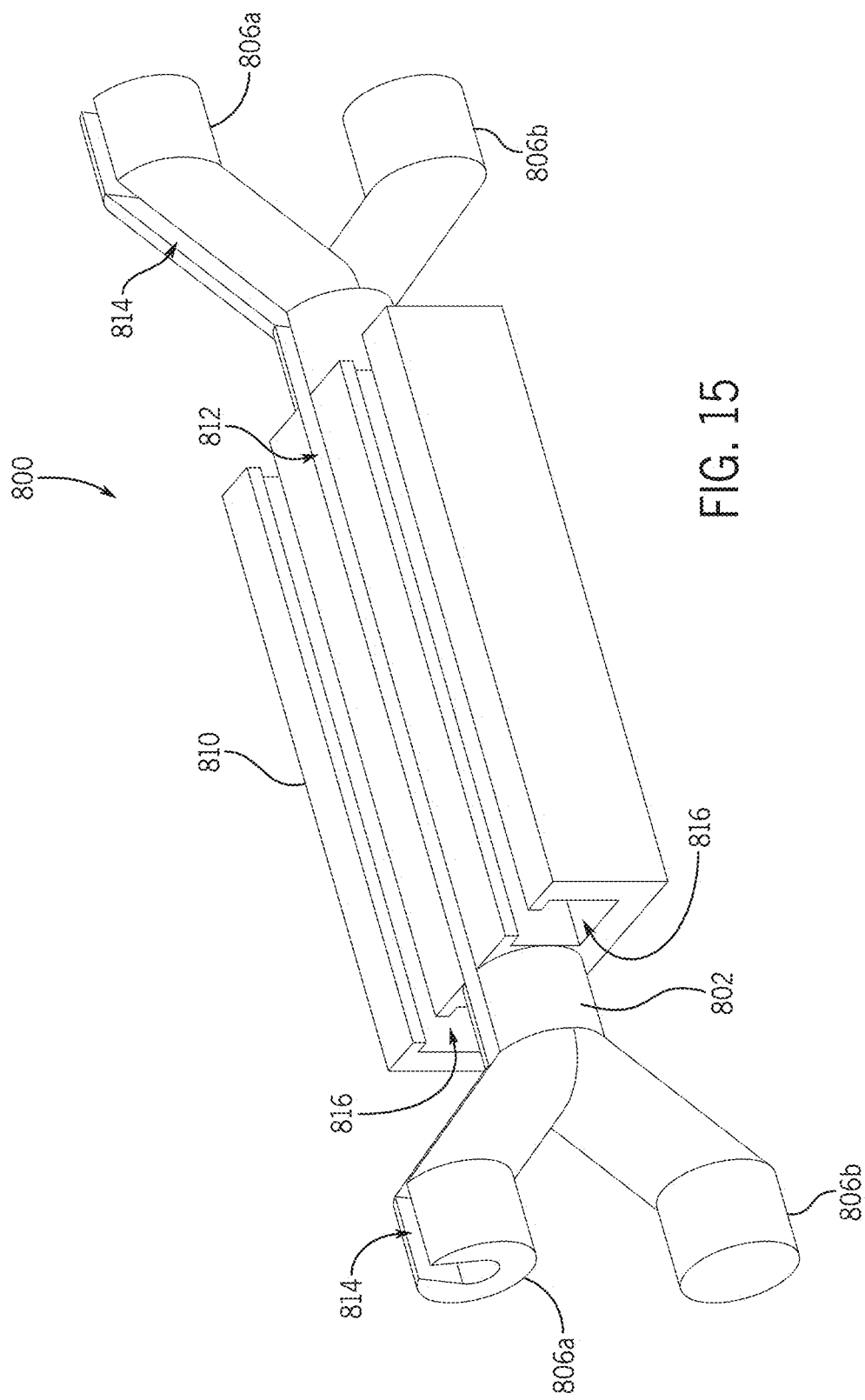
Figure 16:
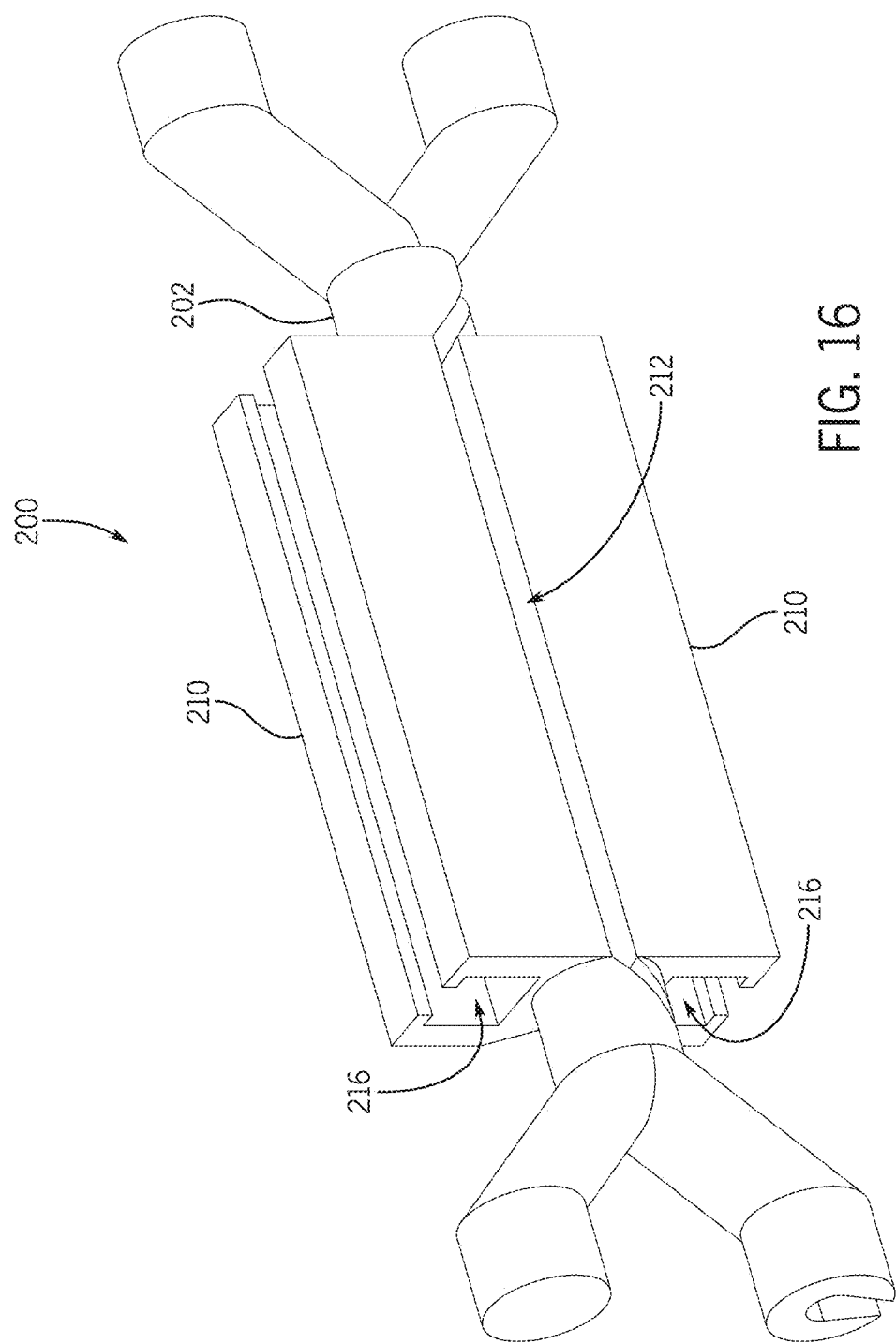
Figure 21:
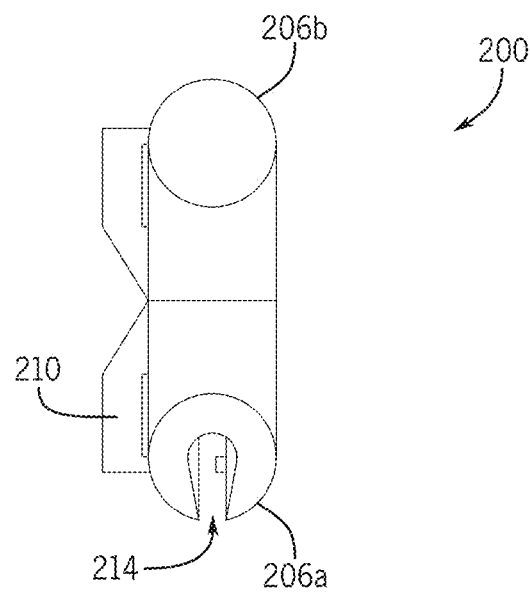
Figure 22:
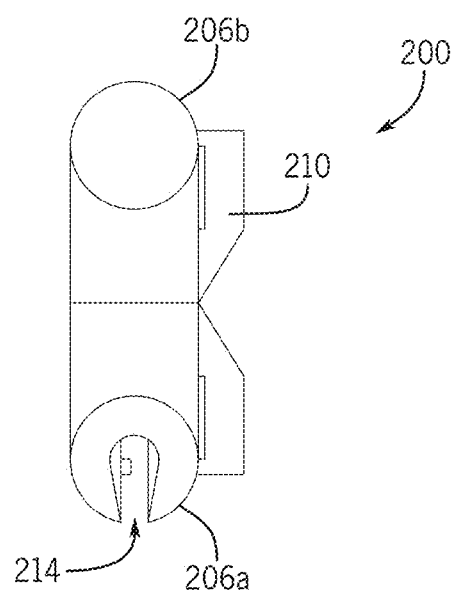

FIG. 15 is an isometric view of an in-line headphone holder 800, similar in form to the headphone holder 700 of FIGS. 7-14, but having the storage channels 816 defined on the same side as the retention channel 812 and slots 814 for receiving the headphone cable. In such examples, the retention channel 812 may extend along the central body 802 between the storage channels 816. In one example, the retention channel 812 may extend substantially parallel to at least one of the storage channels 816, such as substantially parallel to both storage channels 816 in the illustrative example of FIG. 15.

FIGS. 16-22 illustrate additional views of the headphone holder 200 of FIGS. 2A-2B. As shown, the retention channel 212 may jog around the earbud holders 210 along the shaft of the central body 202, similar to the retention channel 112 described above. In such examples, a portion of the retention channel 212 extending along the shaft of the central body 202 may be positioned between the earbud holders 210 positioned on opposite sides of the central body 202.

Figure 23:
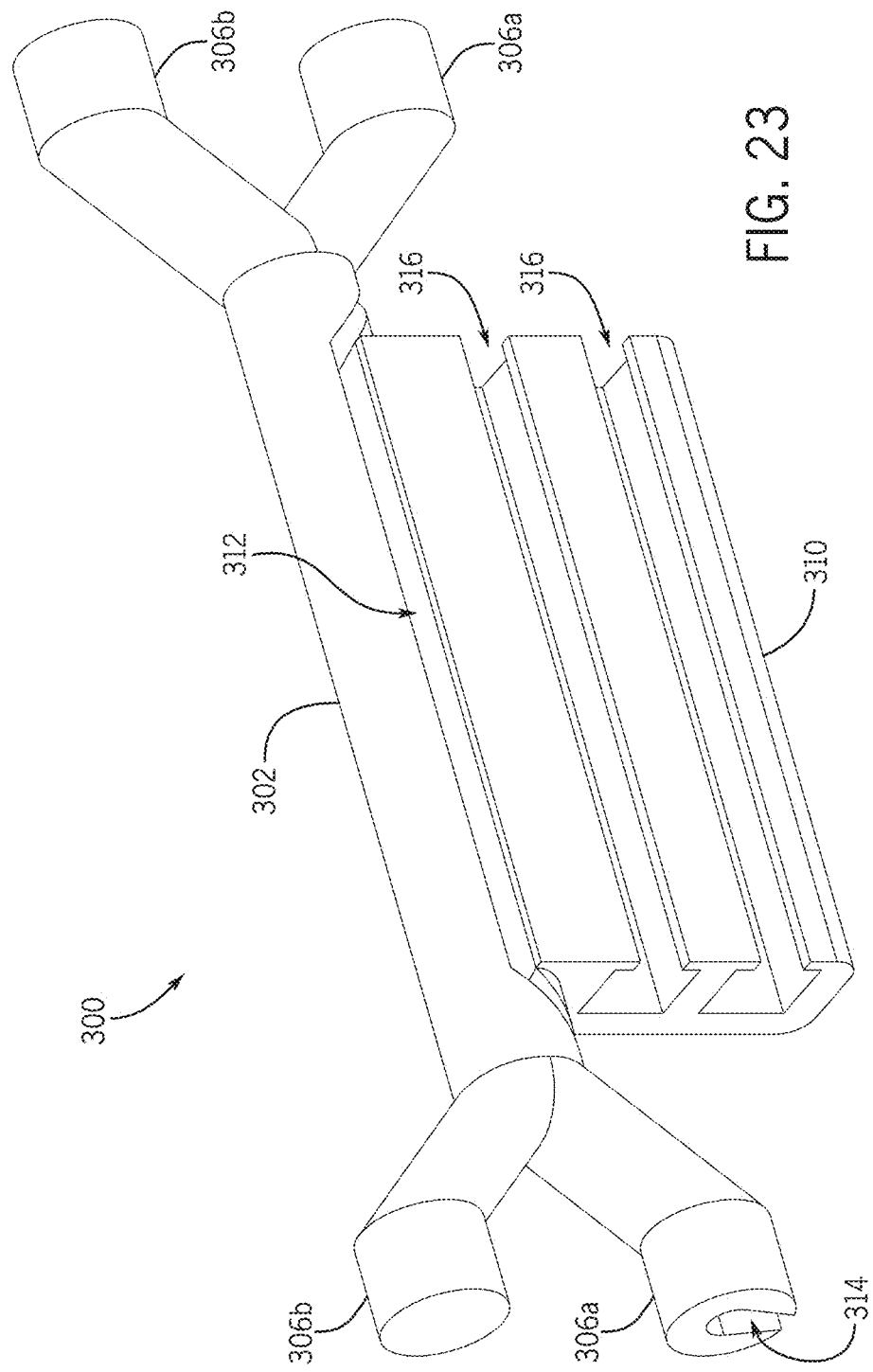

FIG. 23 illustrates an additional view of the headphone holder 300 of FIGS. 3A-3C. As shown, a first of the storage channels 316 may be positioned adjacent to an edge of the central body 302, with a second of the storage channels 316 positioned adjacent to the first of the storage channels 316 and separated from the central body 302 thereby. Similar to the headphone holder 800, the storage channels 316 may be defined on the same side of the headphone holder 300 as the slots 814 for receiving the headphone cable within tines 806a.

Figure 24:
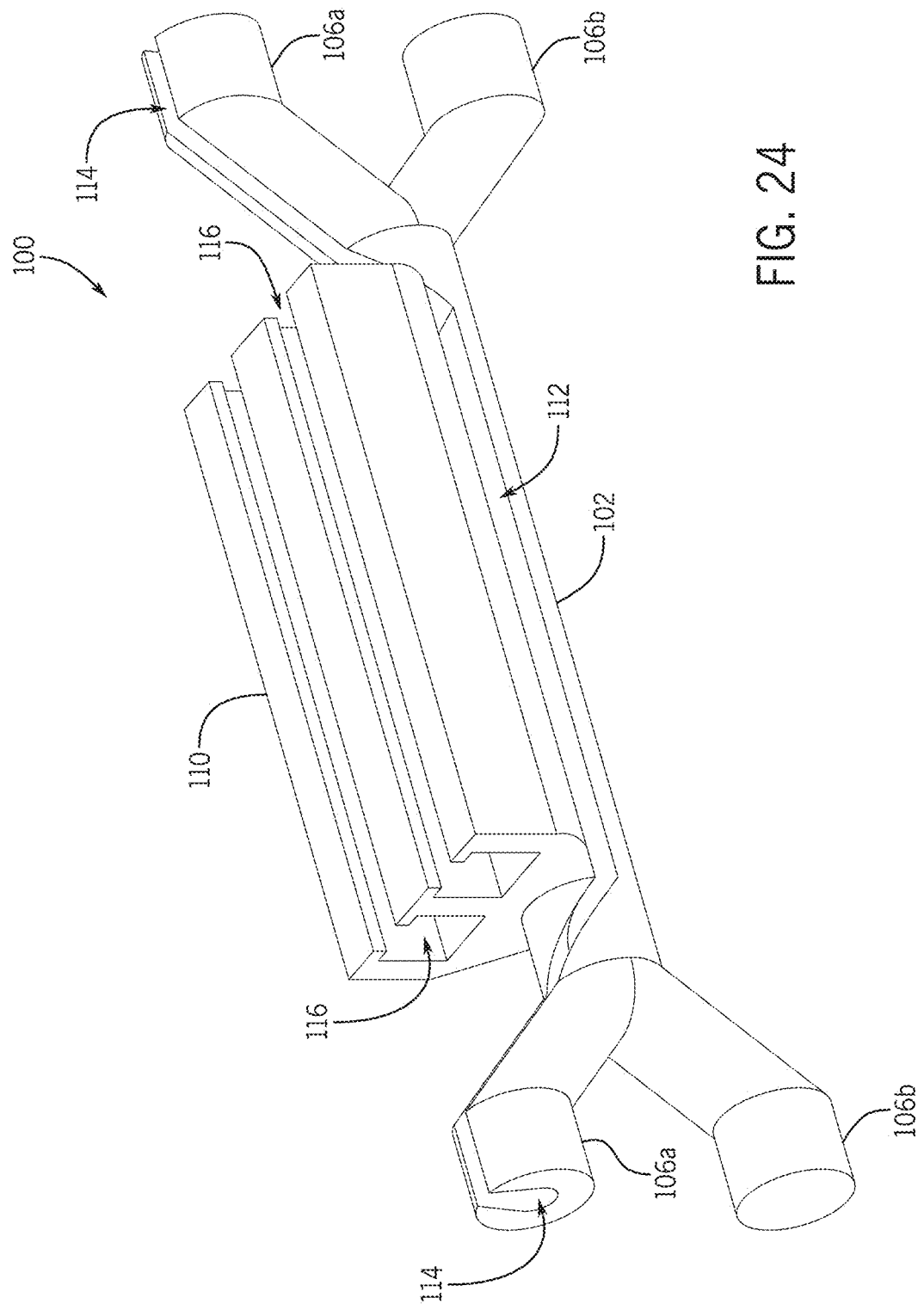

FIG. 24 is an isometric view of in-line headphone holder 100 of FIGS. 1A-1D. Similar to the headphone holders 300 and 800, the storage channels 116 may be defined on the same side of the headphone holder 100 as the slots 114 for receiving the headphone cable within tines 106a. As shown and described above, the retention channel 112 may jog around the earbud holder 110 along the shaft of the central body 102.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order, and relative sizes reflected in the drawings attached hereto may vary.

The above specification, examples, and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A headphone holder comprising:
an elongated central body; and
a pair of forked portions, one on each end of the central body, and each comprising two tines,
the central body defining a retention channel running continuously along a length of the central body between the forked portions, the retention channel configured to receive and secure a length of a headphone cable, wherein the retention channel comprises a first portion extending in a first direction parallel to a longitudinal axis of the central body and a second portion extending at an angle relative to the longitudinal axis of the central body.

2. The headphone holder of claim 1, wherein one of the tines of each of the forked portions defines a slot therein configured for receipt and storage of portions of the headphone cable.

3. The headphone holder of claim 2, wherein the slots in the tines of the forked portions extend to form a contiguous extension of the retention channel in the central body.

4. The headphone holder of claim 2, wherein the slots in the tines of the forked portions define a central conduit and a slot of a narrower width than a diameter of the central conduit, the slot extending from the central conduit and being open to an external surface of the tines.

5. The headphone holder of any of claim 4, wherein the headphone holder is made of a pliable and resilient material such that the slot is expandable in width upon exertion of an external prying force.

6. The headphone holder of any of claim 2, wherein the one of the tines of each of the forked portions is larger in cross-sectional dimension than the other of the tines of each of the forked portions.

7. The headphone holder of claim 6, wherein the one of the tines of each of the forked portions has a diameter larger than the other of the tines of each of the forked portions.

8. The headphone holder of claim 1, wherein the tines each extend angularly outward from a central longitudinal axis of the elongated central body.

9. The headphone holder of claim 8, wherein the tines each further comprise an end portion that extends parallel to the longitudinal axis of the elongated central body.

10. The headphone holder of claim 1, further comprising a earbud holder attached to and extending from a sidewall of the central body, wherein the earbud holder defines a pair of storage channels configured to receive and retain a stem or cable extending from an earbud of a headphone.

11. The headphone holder of claim 10, wherein the storage channels extend parallel to each other.

12. The headphone holder of claim 10, wherein the storage channels are positioned on opposite sides of the elongate body and the retention channel is positioned between the storage channels.

13. The headphone holder of claim 10, wherein the earbud holder is positioned along a single longitudinal edge of a sidewall of the central body.

14. The headphone holder of claim 13, wherein a first of the storage channels is positioned adjacent to the single longitudinal edge of the sidewall of the central body and a second of the storage channels is positioned adjacent to the first of the storage channels and separated from the central body thereby.

15. The headphone holder of claim 10, wherein the storage channels extend along the length of the central body.

16. An headphone holder comprising:
a central body including opposing ends;
a pair of cord retaining members extending from the opposing ends of the central body;
an earbud retaining member extending from a portion of the central body between the opposing ends, the earbud retaining member including a pair of storage channels each configured to receive and retain a stem of an earbud of a headphone; and
a retention channel recessed into the central body and extending along a length the central body between its opposing ends, wherein the retention channel comprises a varied width that increases along a depth of the retention channel.

17. The headphone holder of claim 16, wherein each cord retaining member includes a forked portion with a pair of tines.

18. The headphone holder of claim 17, wherein the tines of each forked portion diverge away from each other from an end of the central body to define a Y-shape.

19. The headphone holder of claim 16, further comprising a slot defined in each cord retaining member, the slots of the cord retaining members open to the retention channel of the central body to define a contiguous channel in which to receive a portion of a headphone cable of a headphone.

* * * * *